Nov. 12, 1968   A. J. BIRO ET AL   3,410,040
STAINLESS STEEL-CLADDED DOOR
Filed Sept. 14, 1966   2 Sheets-Sheet 1
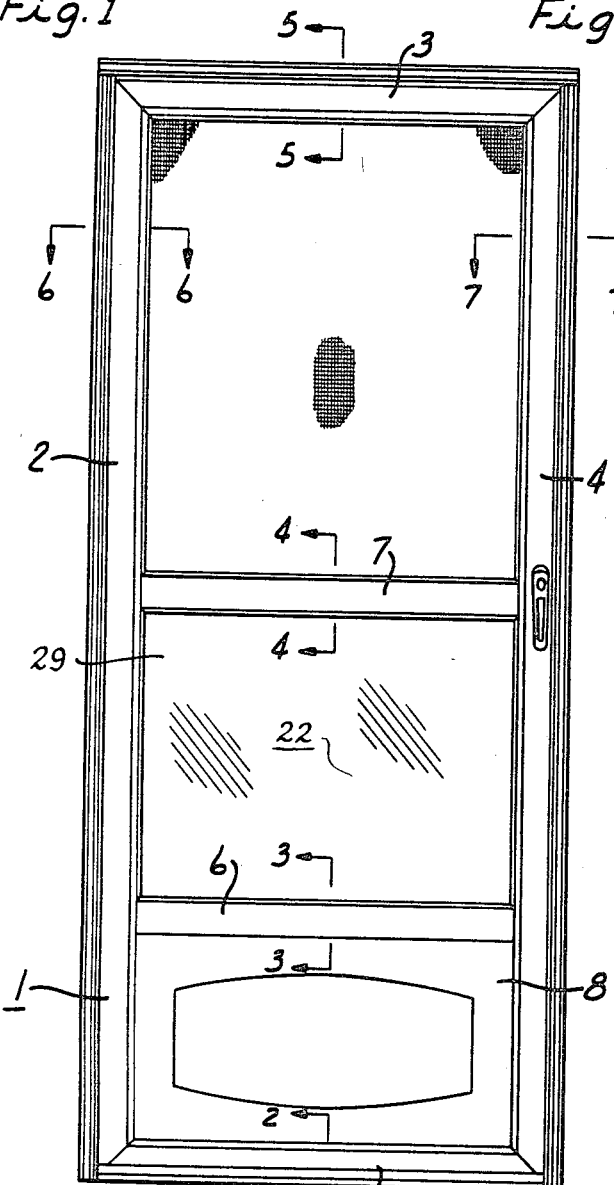
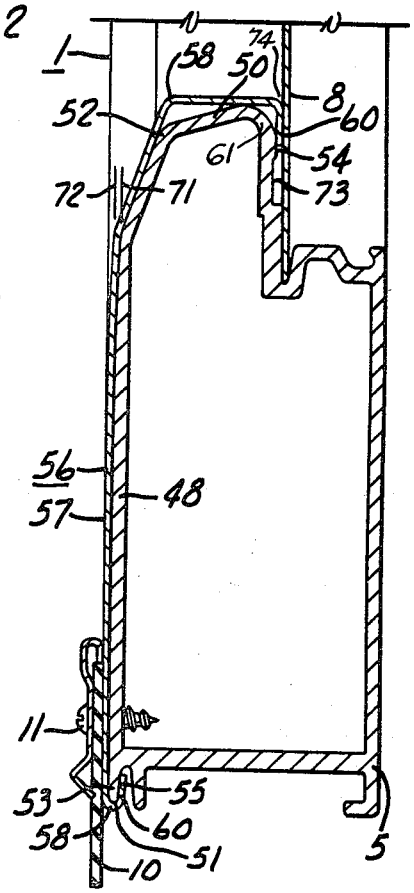
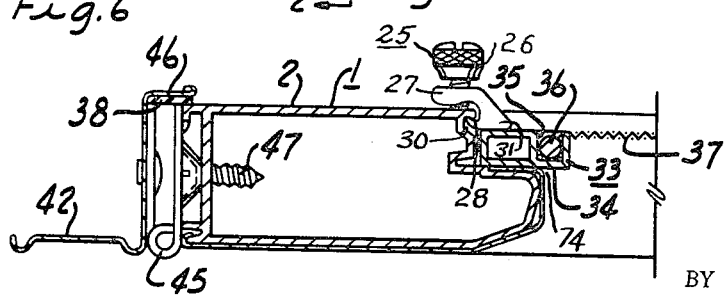
INVENTORS
ALEXANDER J. BIRO
& KENNETH GAHAGAN
BY
CAROTHERS & CAROTHERS
THEIR ATTORNEYS Nov. 12, 1968  A. J. BIRO ET AL  3,410,040
STAINLESS STEEL-CLADDED DOOR
Filed Sept. 14, 1966  2 Sheets-Sheet 2
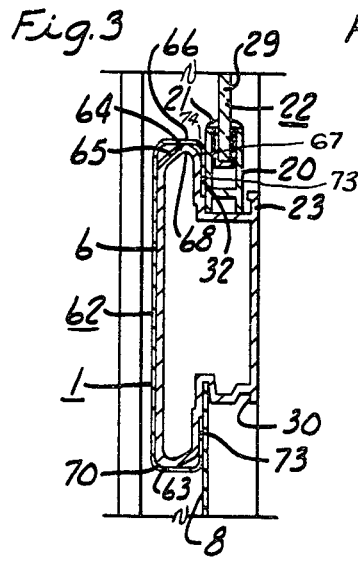
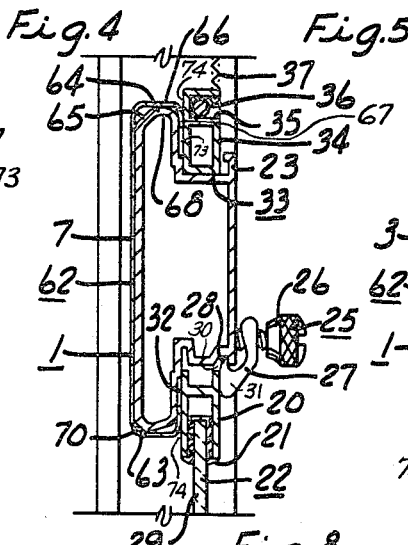
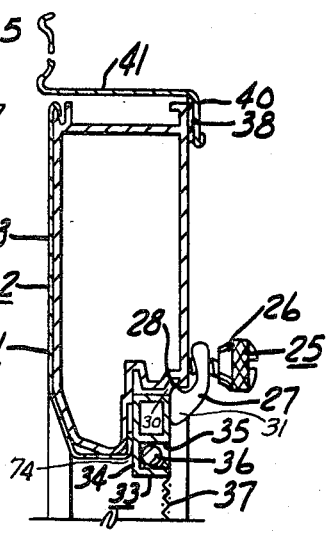
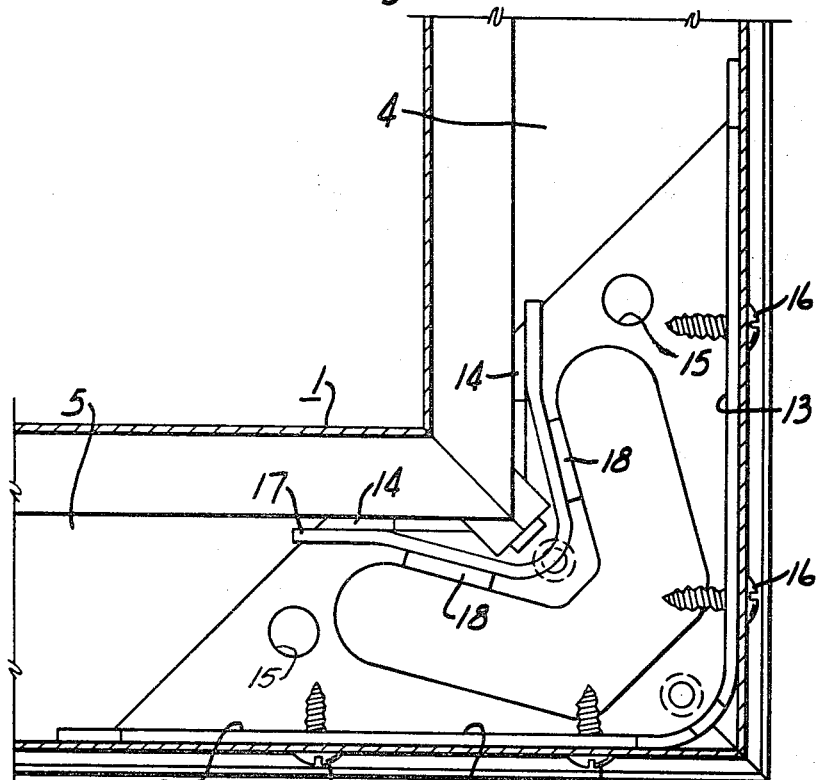
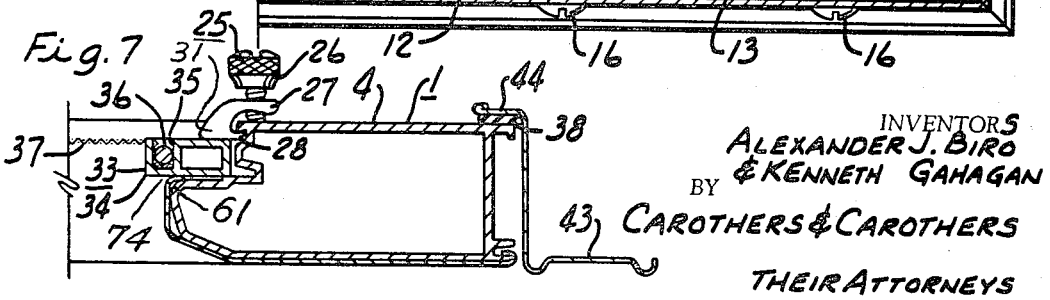
INVENTORS
ALEXANDER J. BIRO
& KENNETH GAHAGAN
BY CAROTHERS & CAROTHERS
THEIR ATTORNEYS United States Patent Office 3,410,040
Patented Nov. 12, 1968

3,410,040
STAINLESS STEEL-CLADDED DOOR
Alexander J. Biro, Indiana, and Kenneth N. Gahagan, Karen Drive, Allegheny County, Pa., assignors to Season-All Industries, Inc., a corporation of Pennsylvania
Filed Sept. 14, 1966, Ser. No. 579,285
6 Claims. (Cl. 52—222)

ABSTRACT OF THE DISCLOSURE

An ornamental cladded structural frame member comprising an elongated structural frame secttion to which is applied an outer covering in the form of a complementary flexible cladding member such as stainless steel. The frame section may be, for example, the side stiles, mullions, lintel or sill of a door frame and is provided with a front face having a curved convex surface and side faces which form with the front face, marginal side edges with back marginal surfaces. The cladding member has a planar panel section for engagement with the frame section front face and opposed inturned marginal flanges to grip over the frame section side edges and embrace the back marginal surfaces of the frame section side edges. In this manner, the cladding member is caused to be curved over the frame section front face convex surface and snapped into position with the inturned flanges of the cladding member engaging the back marginal surfaces of the frame section to place the cladding member in a condition of stressed tension.

---

This invention relates generally to ornamental or decorative cladding and more particularly to ornamental weather resistant cladding to grip and cover a structural frame member, such as, a door or window frame or outside framework of a building and the method of applying such cladding to such structural frame members.

The specific problem involved, herein, arose in the field of the manufacture of window and door frames of all types and varieties, although the inventive structure and method of applying the same is applicable to other fields of art including the building construction art, and the electric appliance fiield and fields involving products that are built with a quality directed to appeal to the aesthetic emotions of a purchaser or customer.

Heretofore, aluminum has been a very basic material used in the manufacture of windows and doors such as combination screens and storm windows and doors, since aluminum will not rust, is light in weight, and a relatively maintenance-free metal. In recent years, these aluminum products have been coated through an electrostatic coating process to give the aluminum a long lasting covering. Although aluminum does not oxidize quickly it does become pitted and acquires a heavy aluminum oxide appearance on the surfaces exposed to weather conditions, rendering the aluminum framework unsightly. This has been a big draw-back in the use of aluminum in the manufacture of windows and doors. The electrostatic coating process has eliminated this problem and at the same time permits a wide choice of colors that may now be applied to, for example, aluminum window and door structures, to meet the ever growing demand for color-combinations in renovation and construction of homes and commercial buildings.

One of the most eye appealing surfaces for application of structural frame members is the group of metals known as the "exotic metals" which includes stainless steel. Polished stainless steel is an excellent material for structural frame members, such as doors and windows for commercial and home use, since it has a beautiful reflectant surface which is easily mantained by occasional wiping. However, the use of stainless steel as the material in the manufacture of door frames, window frames, etc. is prohibitive in view of the high cost of stainless steel and its excessive weight. A stainless steel door cannot be easily supported on hinges in a door jam due to the weight imposed on the supporting hinges. As a result the door will eventually sag and cause the edges of the door to contact and rub against the door jam. Correction of the situaion involves much labor and expense especially since the edges of the door cannot be shaved as in the case of a wooden door.

The principal object comprising this invention is the provision of an ornamental weather resistant cladding to cover the surfaces of a structural frame member exposed to elements of weather which may be snapped-on in position on the structural frame member. The cladding is suciently secure to prevent its accidental removal therefrom.

Another object of the present invention is the provision of an ormental cladding for structural frame members which give a wide choice of materials having desired aesthetic appeal and appearance. An example of such materials are the so called "exotic metals" metal laminates, wood grain thermo-plastic and metallic coated materials and plastic formed materials. Any decorative material that may be formed or molded into the desired shape for the cladding to be applied to the structural frame member having some flexibility to permit it to be snapped into position on the structural frame member is sufficient to perform the embodiments comprising this invention.

Another object of the present invention is the provision of an ornamental weather resistant cladding of polished stainless steel for covering the exterior surfaces of aluminum structural frame members exposed to weather and atmospheric conditions to provide the appearance of an all stainless steel structural frame member but yet, relatively, of much less weight than such a frame member.

Another feature comprising this invention is the manufacture of cladded structural frame members incorporated into such articles such as doors, windows, etc., wherein there is provided structural frame sections having side and front faces and a complementary flexible cover member with opposed inturned flanges to flexibly engage back marginal edges of the frame sections to snap-on in position on the frame sections. The ends of the cladded structural frame sections are cut off by a special radial cut-off saw, without marring the finished surface of the cladding material, so that the frame sections may, thereafter, be secured together to form a cladded structural frame member. The radial cut-off saw is an abrasive saw-disc of resinoid or rubber bond which actually "grinds" and "burns" away the metal or other material to be cut for the cladding, rather than cut the material out and away from the path of the saw such as in the case of a conventional saw blade. The use of an abrasive saw-disc eliminates an uneven cut edge and marring of the surface of the cladding which would be present upon using a conventional rotary saw. Thus, in the application of polished stainless steel cladding, there is no uneven appearance or marred surface at the ends of the cladding where the structural frame sections are connected together.

Another object comprising this invention is the method of applying a weather resistant covering to the exterior surfaces of a structural frame member wherein there is provided frame sections each having a front exterior face and marginal flange abutment surfaces along its longitudinal edges to which is applied a complementary flexible channel or cladding member having marginal side bends and adjacent inturned opposed flanges. Upon flexure of the marginal side bends and adjacent inturned opposed flanges to clear the abutment surfaces of the frame sections, the complementary channel members may be snapped over the same to grip the frame sections and cover the front exterior face and marginal flange abutment surfaces of each of the frame sections to provide not only a decorative appearance to the structural frame member and, thus, enhance the entire beauty of a building structure, but also provide a rust-free, easily maintained surface for those structural parts and portions of a building strutcure subject to constant exposure to natural weather elements.

Other objects and advantages appear hereinafter in the following description and claims.

The accompanying drawings show for the purpose of exemplification without limiting the invention or claims thereto, certain practical embodiments illustrating the principles of this invention wherein:

FIG. 1 is a view in side elevation of a structural frame member, specifically, a door.

FIG. 2 is an enlarged sectional view along the lines 2—2 of FIG. 1 illustrating the principle comprising this invention.

FIG. 3 is a cross-sectional view taken along the line 3—3 of FIG. 1.

FIG. 4 is a cross-sectional view of a door mullion taken along the line 4—4 of FIG. 1.

FIG. 5 is a cross-sectional view taken along the line 5—5 of FIG. 1.

FIG. 6 is a sectional view taken along the line 6—6 of FIG. 1.

FIG. 7 is a sectional view taken along the line 7—7 of FIG. 1.

FIG. 8 is a longitudinal sectional view of a corner of the door frame member showing the gusset connection for the door frame sections.

Referring now to the figures there is shown a typical product used in the building industry, the exterior surfaces of which are exposed, constantly, to weather elements and thus is continuously subjected to changes in temperature conditions as well as different types of precipitation as well as the constant rays of sun light. FIG. 1 illustrates a conventional combination storm and screen door. Although a door is shown in the drawings, it should be clearly understood that the inventive concept disclosed herein can be applied to other structural frame members as well as a door. Examples of such other structural frame members are combination storm and screen windows, patio doors, exterior frame work of large buildings, home appliances such as refrigerators, dish washers, washing machines and the like.

A door structure as shown in FIG. 1 consists of the frame member 1 which consists of four frame sections 2, 3, 4 and 5, each having the same cross-sectional configuration in order to create a uniform rectangular shape frame structure. The mullions 6 and 7 strenghthen the frame member 1 and also support the glass and screen inserts of the door. Between the bottom frame section 5 and mullion 6 there is provided the kick plate 8 which may be constructed of a solid decorative material.

As shown in enlarged FIG. 2, the bottom of the frame section 5 may be provided with a door sweep 10 which is maintained in close contact with the bottom of the door jam. The door sweep 10 may be fastened to the frame section 5 by any suitable means such as the screws 11.

As shown in FIG. 8, the frame sections 2, 3, 4 and 5 are secured together to form the frame member 1 by the gusset member 12. Each of the frame sections 2 through 5 is of hollow channel structure to provide a frame member 1 of light weight and less cost and at the same time one of considerable strength. Such frame sections are generally made of aluminum extrusions and are cut to the desired lengths depending upon the necessary size of the frame member 1. The gusset members 12 are of right angle configuration having upwardly extending sides 13 and 14. Openings such as 15 may be provided in the right angle structure in order to decrease the weight of the gusset member 12 and thus decrease the overall weight of the frame member 1. The ends of the right angle gusset member 12 are inserted in the ends of the frame sections to be secured together and it is fastened to the frame sections by the sheet metal screws 16 through the frame section and through the sides 13 of the gusset member 12.

The sides 14 and abutments 18 of the gusset member 12 aid in supporting the gusset support 17. The gusset support 17 is an important added feature to the gusset member since it prevents the connected frame sections, after being connected, from remaining easily twisted one relative to the other, and, thus, adds rigidity to the corner connections of the frame member 1. The gusset support 17 is not held in position by any fastening means since the sides 14 as well as the abutments 18 maintain the gusset support 17 in its proper position to rigidly aid in supporting the connection of adjacent frame sections. Thus, the gusset support 17 is an important features in the construction of strong but light weight structural frame members, such as the door structure shown in FIG. 1.

Each of the mullions 6 and 7 are secured to the frame sections 2 and 4 on the rearward side of the frame member 1 with sheet metal screws. The mullions 6 and 7 support the glass insert 22 which is provided with a sash 20 and a glazed channel 21 to support the glass 29. The flange 23 on the mullion 6 forms the upwardly open channel 24 to receive the bottom sash member of the glass insert 22. The upper sash member of the glass insert 22 is held in position shown by the stabilizer 25 which consists of the sheet screw 26 and the clamp member 27. The clamp member 27 is provided with an inwardly extending flange portion 28 which fits in the groove 30 provided in the mullion members 6 and 7. Upon tightening of the sheet screws 26 the flange portion 28 of the clamp member 27 is caused to pivot in the groove 30 and pressure is brought to bear against the upper sash member by the toes 31 of the stabilizers 25 to securely hold the entire glass insert and the sash 20 flush against the back marginal surfaces 32 of the mullions 6 and 7.

The screen insert 33, as shown in FIGS. 4 and 5, is supported by a sash member 34 which is provided with a channel 35. The perimetral edge of the screen 37 is laid within the channel 35 so that the screen may be held in a state of tension by the elastomer screen spline 36.

The screen insert 33 is held in position in the frame member 1 between the mullion 7 and the frame section 3 in the same manner as the glass insert 22 by the stabilizers 25, as previously explained stabilizers 25 may also be provided along the vertical sides of the inserts as, is indicated in FIGS. 6 and 7.

As shown in FIG. 5 the frame section 5 is provided with a cushioning tape member 38 to be received by the jam flange 40 of the Z-bar member 41. In this connection, as shown in FIGS. 6 and 7, there is provided the Z-bar members 42 and 43 to provide a door jam for the door, upon installation. In FIG. 7, the Z-bar member 43 also has a jam flange member 44 for engagement of the door frame member upon closure of the same. The cushioning tape member 38 provides not only protection against noise caused upon the door being closed but also acting as a weather seal.

In FIG. 6 the Z-bar member 42 is riveted to the hinges 45 which in turn is secured to the frame section 2 by means of the hinge screws 47 to rotatably support the door frame member 1 after the Z-bar 42 is secured to the existing door jam. The cushioning tape member 38 is also provided on the jam flange member 46 of the Z-bar 42 for the same purposes as in the case of the Z-bar members 41 and 43.

Each of FIGS. 4 through 7 illustrate the principal feature comprising this invention which entails the covering of the frame member 1 with a cladding member not only for ornamental and decorative purposes but also to protect the surfaces with a weather resistant material. As shown in enlarged FIG. 2, the frame section 5 is a generally hollow channel structure made from material, such as extruded aluminum, and is provided with a front face 48 and side faces 50 and 51 together which form the longitudinal corners or edges 52 and 53, respectively. The side faces 50 and 51 as well as the front face 48 are the surface generally exposed to weather and atmospheric conditions and thus are the surfaces or faces which must be covered for protection as well as the surfaces to be covered for ornamental purposes.

The frame section 5 as well as the other frame sections, herein, disclosed are provided with the back marginal surfaces 54 and 55 upon which the snap-on cover member 56 grips to secure the same in position on the frame section. The snap-on cover member 56 comprises generally the front panel section 57 which is in mating engagement with the front face 48 of the frame section. The snap-on cover member 56 is provided with a marginal bend 58 along each of its marginal edges which in turn support opposed inturned side flanges 60 which grip the back marginal surfaces 54 and 55 of the frame section to hold and maintain the cover member 56 in a secure position on the frame section.

It should be noted that the snap-on cover member 57 is sufficiently flexible in order that at least one of the opposed inturned flanges 60 will engage, for example, the side face 50 of the frame section and, upon flexure, clear the same and snap-on in position on the back marginal surface 54.

In connection with the frame structure shown in FIG. 2, it should be noted further that the side face 50 may be chamfered or beveled, as shown, to provide surface clearance and permit the complementary inturned flange 60 to pass the toes 61 and engage the back marginal surface 54. Thus, the side face 51 does not necessarily need to be of large extent and, therefore, may encompass only the marginal bend 53. Marginal bend 53, then acts as a pivotal point for the snap-on cover member 56 to be held by the marginal edge or side 51 in position while the other marginal edge 58 of the cover member may be flexed in order that the opposed inturned flange 60 may pass over the toe 61 to engage the back marginal surface 54.

The same principles are involved in securing the snap-on cover member 62 on the mullions 6 and 7. In the case of mullions 6 and 7, the cross sectional configuration is completely different from that of the frame sections 2 through 5. However, the principal embodiments of the invention and method of applying snap-on cover members are the same. On close examination of FIGS. 3 and 4, it will be noted that the opposite side surfaces 63 and 64 of the mullions are not identically the same. As shown at 65 the side 64 is provided with a chamfered or beveled surface 65 to permit the passage of the marginal sides 66 and adjacent inturned opposed flange 67 to pass over the toe 68 of the side 64 while the opposite marginal side 66 and adjacent inturned opposed flange 67 are maintained secure over the edge or side 63. In this connection the edge 63 of the mullions 6 and 7 is not provided with a chamfered or beveled surface, but rather is provided with a longitudinal nose 70 in order to aid in maintaining the cover member 62 in a state of tension when the latter has been secured in position on the mullion.

Referring again to large FIG. 2, the front face 48 may be provided with a slight crown as illustrated by the dimensional lines 71 and 72 in order to place the front panel section 57 of the snap-on cover member 56 under a state of tension when the cover member has been secured in position on the frame section. The same is true of the front face 69 of the mullion cover 62. The maintenance of the surfaces of a flush front panel section of the cover member in a state of tension is important in the utilization of ornamental materials, such as polished stainless steel in order to give the frame member 1 a uniform appearance in its reflectant capabilities. Otherwise, due to the high reflectance of high polished stainless steel, the frame member 1 will have the appearance of being distorted and thus having a determined effect on its overall aesthetic appearance. In these cases, the cover member is preferably placed under a state of tension to effectively eliminate the effect of the unevenness of the cover member surface.

The back marginal surfaces 54 of the frame sections as well as the back marginal surfaces 32 of the mullions may be provided with the longitudinal relief surfaces or grooves 73 in order for the sash members 20 and 34 to be positioned in tight engagement against the inturned opposed flanges 60 and 67 of the respective cover members 56 and 62. This provides a weather seal at the place of engagement, being designated at 74 in FIGS. 2 through 7, in order to prevent the penetration of water, wind, etc., into the interior portions of the door, window or the like. Also, it should be noted that the securing of the inserts 22 and 33 into engagement against the mullions and adjacent frame sections aids in holding the opposed inturned flanges 60 and 67 in position on their respective back marginal surfaces 54 and 32.

The inturned opposed flanges may be inwardly curved convex cross-sectional contour to intensify their engagement or the back marginal surfaces to permit the opposed inturned flanges to "find" themselves on the back of the marginal surfaces of the frame sections and the mullions.

From the foregoing description of the structural features the ornamental weather resistant cladding comprising this invention, it is readily understood that the application of the snap-on cover member to the exterior surfaces of the frame member 1 provides a cladded structural frame member wherein the cover member remains secure to the basic frame member although the snap-on cover member is easily secured into its position. The snap-on cover member being of sufficiently thin material may be flexed to permit the marginal bends and adjacent inturned opposed flanges to clear the abutment surfaces of the sides of the frame sections or mullions and thereafter recede to encompass the frame section or mullion and grip the back marginal surfaces thereof to produce weather resistant cladding having decorative or ornamental features desired in home and commercial buildings.

Although the foregoing illustration of the embodiment comprising this invention is illustrated in a frame member comprising a door, it should be clearly understood that the same constructive features for applying a weather resistant cladding to the surfaces of other types of structural frame members in other fields of art may be utilized and these features are not limited to the specific structural application disclosed herein.

We claim:

1. An ornamental cladded structural frame member comprising an elongated structural frame section having side and front faces, an opposed pair of side edges formed at the jointure of said side and front faces each having longitudinally extending back marginal surfaces, said front face characterized by an outer curved convex surface, a complementary flexible cladding member having a planar panel section for engagement with said front face curved convex surface, a marginal inturned flange along the marginal edges of said cladding member to respectively grip around said frame section side edges with said inturned flanges embracing said back marginal surfaces, one of said frame section edges provided with sufficient clearance to permit a respective cladding member marginal edge to clear the same to cause said cladding member planar panel section to curve adjacently over the said frame section curved convex surface to place the cladding member in a condition of stressed tension.

2. The ornamental structural cladded frame member of claim 1 characterized by a longitudinal relief surface along at least one of said back marginal surfaces in a frame section side edge and forming a shoulder adjacently therealong, one of said cladding member inturned flanges embracing said relief surface, a channel in said frame section side face adjacent said shoulder along the length thereof to receive a sash member side rail to abut tightly against said cladding member inturned flange to form a weather seal therebetween.

3. The ornamental structural cladded frame member of claim 2 characterized in that said cladding member inturned flanges have an inwardly curved convex cross-sectional contour.

4. The ornamental structural cladded frame member of claim 1 characterized in that said surface clearance on said frame section side edge is a chamfered relief surface to permit the adjacent complementary inturned flange of said cladding member to clear the same.

5. The ornamental structural cladded frame member of claim 4 characterized by a chamfered relief surface in both of said frame section side edges to permit adjacent complementary inturned flanges of said cladding member to clear the same.

6. In an ornamental frame structure, a metal frame consisting of extruded metal sections secured together to form a rigid frame, a stainless steel cladding member to cover a portion of the surfaces of said rigid frame, said extruded metal sections having side and front faces, an opposed pair of said edges formed at the jointure of said side and front faces each having longitudinally extending back marginal surfaces, said extruded metal section front face characterized by an outwardly curved convex surface longitudinally thereof, said stainless steel cladding member having a planar panel section for engagement with said front face curved convex surface and opposed marginal inturned flanges along the marginal edges of said panel section to grip around said side edges with said inturned flanges embracing said back marginal surfaces, a chamfered relief surface on one of said extruded metal sections side edges to permit one of said stainless steel cladding member marginal inturned flanges upon flexure of said member to clear the same and engage its respective back marginal surface to cause said cladding member planar panel section to curve over said front face curved convex surface to place the stainless steel cladding member in a condition of stressed tension.

References Cited

UNITED STATES PATENTS

| | | | |
|---|---|---|---|
| 1,827,743 | 10/1931 | Groehn | 52—222 X |
| 2,692,664 | 10/1954 | Ternes | 52—222 |
| 2,914,147 | 11/1959 | Millard | 52—222 |
| 1,984,134 | 12/1934 | Himmel et al. | 52—727 X |
| 2,286,493 | 6/1942 | Lowry | 52—455 |
| 2,383,575 | 8/1945 | Wernig | 49—501 |
| 2,919,477 | 1/1960 | Schacht | 52—455 X |
| 3,155,461 | 11/1964 | Hunt | 52—727 |
| 3,173,523 | 3/1965 | Mote | 52—222 |

FOREIGN PATENTS

| | | |
|---|---|---|
| 943,962 | 12/1963 | Great Britain. |
| 638,670 | 4/1962 | Italy. |

FRANK L. ABBOTT, *Primary Examiner.*

A. C. PERHAM, *Assistant Examiner.*